Sept. 30, 1958     C. W. MacMILLAN     2,853,790
SUSPENSION HEIGHT GAUGE FOR VEHICULAR
TORSION BAR SUSPENSION SYSTEMS
Filed May 13, 1957
Fig.1
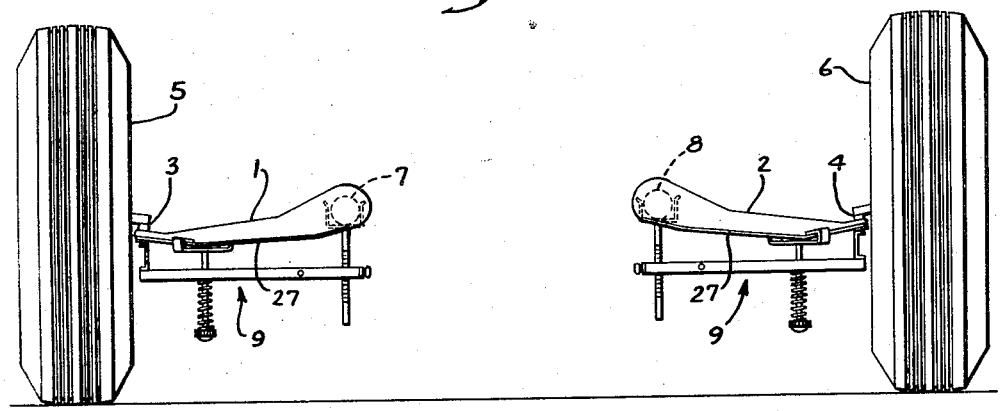
Fig.2
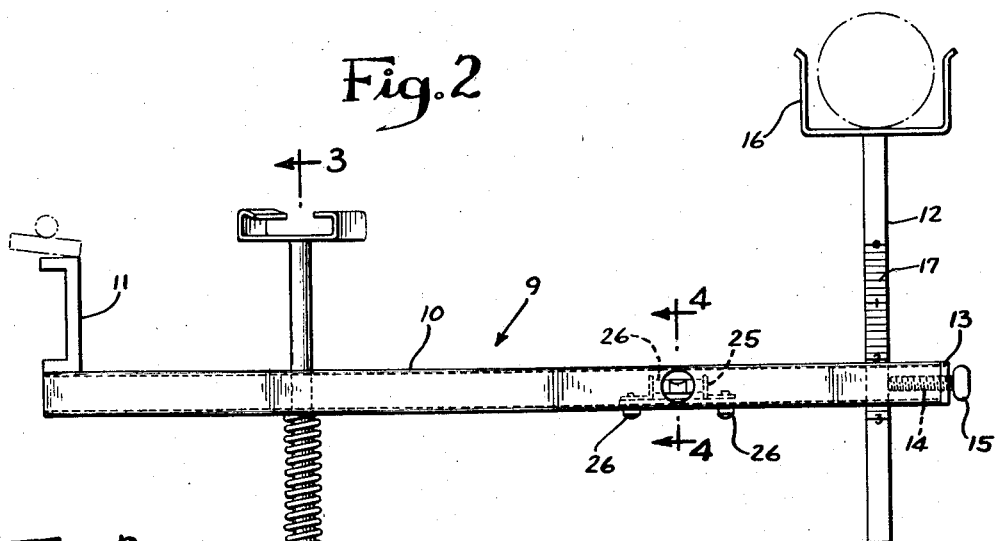
Fig.3
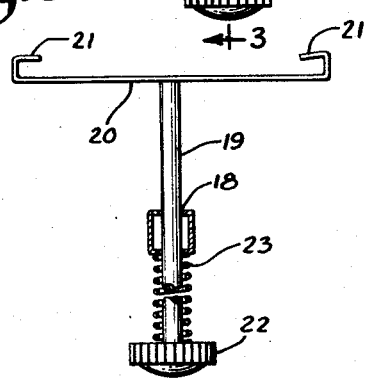
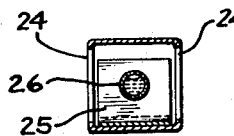
Fig.4
*Inventor*
CHARLES W. MacMILLAN
by: Gary, Desmond & Parker
                                *Attys.*

2,853,790

SUSPENSION HEIGHT GAUGE FOR VEHICULAR TORSION BAR SUSPENSION SYSTEMS

Charles W. MacMillan, Rock Island, Ill., assignor to Bear Manufacturing Company, Rock Island, Ill., a corporation of Delaware Application May 13, 1957, Serial No. 658,775

6 Claims. (Cl. 33—180)

This invention relates to improvements in a gauge for measuring or checking the suspension height of torsion bar suspension systems employed on automotive vehicles.

For a predetermined vehicle it is desirable to have the torsion bar on each side of the vehicle, when the vehicle is unloaded and at rest, subjected to such torsions that the vehicle is level and that the suspension height is within predetermined limits.

During use of the vehicle, however, the level of the vehicle may change or the suspension height may change, which requires that the torsion bars be adjusted to change the torsion and restore the vehicle to its required height and levelness. This can be done by increasing or decreasing the torsion of the bars by rotating them about their axes by means of conventional lever arm adjustments provided at their rear anchorages until the desired suspension height and level is secured.

In initially torsioning the bars or resetting the torsion thereof, it has been the practice to measure the distance between two measuring points on the control arm of the suspension system on each side of the vehicle, to the ground. When the suspension height is brought to a predetermined dimension and the vehicle is suspended in a level condition the torsion of the torsion bars is then considered adequate. However, to secure the desired measurements has heretofore been a laborious and inconvenient task.

The present invention is directed to a gauge which greatly simplifies the task of securing the desired measurements hereinbefore described, the gauge being characterized by its simplicity of operation, its lightness of weight and its ready readability.

In order to secure an accurate measurement of suspension height, it is desirable that the measurements which are first taken, be retaken after the vehicle has been "jounced," that is, vigorously bounced upon its springs.

As a feature of the present invention the gauge can be secured in place upon the vehicle for purposes of obtaining the desired initial readings and can be retained thereon during the jouncing whereby it is immediately in position for taking the verification readings. Thus, the initial test and verification test can be made with one mounting of the gauge on the vehicle.

Other objects, advantages and features of the present invention will be apparent from the accompanying drawing and following detailed description.

In the drawings,

Fig. 1 is a diagrammatic front elevational view of an automotive vehicle, the front wheels and a diagrammatic portion of the suspension system only being shown.

Fig. 2 is an enlarged elevational view of the gauge embodying the concepts of the present invention.

Fig. 3 is a detailed sectional view taken on line 3—3 of Fig. 2.

Fig. 4 is an enlarged transverse sectional view taken on line 4—4 of Fig. 2.

In the conventional independent front wheel suspension systems employed by automotive vehicles, the body of the vehicle is essentially suspended at each side of the vehicle upon lower control arms 1 and 2. The outer ends of these arms are pivotally secured to a lower ball joint assembly 3 and 4 respectively, the assemblies comprising a portion of wheels 5 and 6 respectively. When the vehicle body moves downwardly relative to the wheels, the lower control arms 1 and 2 rotate about the ball joint assemblies 3 and 4 respectively, that is, arm 1 rotates about joint 3 in a clockwise direction and arm 2 rotates about joint 4 in a counterclockwise direction, as viewed in Fig. 1.

In employing a torsion bar suspension system arms 1 and 2 are rigidly connected to torsion bars 7 and 8 respectively both of which extend substantially longitudinally of the vehicle and are adjustably locked or anchored at their rear ends by conventional means (not shown). Hence, from the simplified diagrammatic view shown in Fig. 1 it will be apparent that the weight of the vehicle is supported by and resiliently resisted by the torsional stresses set up in the bars 7 and 8.

It can be appreciated that the height of the vehicle upon the wheels 5 and 6 is a function of the torsion stresses set up in the bars 7 and 8 and that the levelness of the body of the vehicle upon the wheels is a function of the torsional stress in bar 7 relative to the torsional stress in bar 8.

Hence, in adjusting a torsion bar suspension system, two factors of adjustment must be correlated, the height of the vehicle relative to the wheels or to the ground, assuming level ground, and the levelness of the vehicle upon the wheels.

The suspension height of the vehicle is a design function of the vehicle and depends upon the type and make of the vehicle. This is also true as to the permissible differential in suspension height between opposite sides of the vehicle. For instance, in one type of vehicle the tolerance or range of suspension height is maintained plus or minus ⅛ inch with a maximum differential from right to left of ⅛ inch.

Of course, in so far as the present invention is concerned specific recommended tolerances or ranges, in question, are immaterial, but are simply set forth for purposes of illustrating the general order of magnitudes involved.

In testing the suspension height and differential from side to side, it has been customary to make measurements from two measuring points on each lower control arm 1 and 2 to the ground. One measurement comprises the distance between the lower portion of a ball joint assembly, such as 3 or 4, to the ground, and the other measurement is from the lower portions of the respective torsion bars 7 and 8 to the ground. Accordingly, to test the suspension system, four separate measurements must be taken. It can readily be appreciated that as the torsions of bars 7 and 8 are changed, in making adjustments, the four dimensions in question are changed and inasmuch as these dimensions are the guide to the proper adjustment, they must be continuously observed. To keep these four dimensions under observation while simultaneously adjusting the torsion of the bars 7 and 8 presents a most difficult task.

As a feature of the present invention, a gauge 9 is contemplated which conveniently gives the necessary information as to the critical dimensions relative to a lower control arm and the ground in terms of the differential in height between a ball joint assembly measuring point and a corresponding torsion bar measuring point. Manufacturers of automotive vehicles frequently recommend adjustment of the suspension heights of their vehicles in terms of this differential. In general, these recommended differentials range from about 1½ inches to 3 inches, more or less, for vehicles of different make and type. The gauge 9 is exceptionally useful in affording convenient determination of this differential.

The gauge 9 comprises a gauge bar 10 which is preferably rectangular or square in section, hollow and of light weight. At one end of the gauge bar a channel member 11 is rigidly carried, said channel, as will be hereinafter more fully described, being employed as an abutment for making abutting contact with the lower surface of the ball joint assembly 3 or 4.

The opposite end portion of the gauge bar 10 is provided with registering apertures for the reception of a gauge rod 12 which is slidably movable through said apertures, the rod 12 being substantially parallel to the abutment 11. A plug 13 is mounted at the end of the gauge bar 10 adjacent gauge rod 12 and a set screw 14 is threadedly positioned in the plug 13, the end of the set screw terminating in a wing 15 whereby it may be conveniently manipulated. The inner end of the set screw 14 bears upon the gauge rod 12 and retains said rod in a desired position relative to the gauge bar 10. The upper end of the gauge rod 12 carries a yoke 16 which, as will be hereinafter more fully described, is adapted to embrace a torsion bar 7 or 8, the bar being adapted to be positioned in contact with the base of the yoke 16. The gauge rod 12 carries calibrations 17 and said calibrations are adapted to indicate the differential in height between the upper end of the abutment 11 and the base of the yoke 16. In other words, when the "zero" of the calibrations 17 is in alignment with the upper surface of the gauge bar 10, the upper end of the abutment 11 and the base of the yoke 16 are at the same elevation.

Intermediate the length of the gauge bar 10 said bar is provided with registering apertures 18 through which an anchor rod 19 passes, said rod being axially movable through the apertures 18. The upper end of rod 19 carries a gripping member 20 which at its opposite ends carries inturned flanges 21. The lower end of the rod 19 carries a knob 22 and a coil spring 23 embraces the lower portion of the rod 19, the spring abutting at its opposite ends against the knob 22 and lower surface of the gauge bar 10 respectively. The gripping rod 19 is disposed upon the gauge bar 10 substantially parallel to abutment 11 and the gauge rod 12.

The gauge bar 10 is also provided with opposite sight openings 24 and a spirit level 25 is positioned within the gauge bar in such position as to have the central portion of its bubble tube 26 visible through the openings 24. The spirit level 25 is secured to the gauge bar 10 by means of screws 26' whereby the axis of the bubble tube 26 may be adjusted relative to the axis of the gauge bar 10.

In employing the gauge 9 the upper end of the abutment 11 is positioned in contact with a measuring point beneath the ball joint assembly 3 or 4. The gripping member 20 is positioned beneath an intermediate portion of a lower control arm and in substantially all cases said control arms carry outward oppositely extending flanges 27. By pushing upwardly on the knob 22 and rotating the gripping rod 19, the gripping member 20 may be disposed at substantially right-angles to the length of the control arm. The distance between the opposite inturned flanges 21 is such that said flanges may be moved upwardly beyond the flanges 27 upon the control arm. In this position the gripping rod 19 may be rotated by rotating knob 22 and thus the inturned flanegs 21 may be brought into engagement with the upper surfaces of the opposite flanges 27 of the control arm under the influence of spring 23. In this position, the yoke of the gauge rod 12 may be brought into embracing relationship to a torsion bar 7 or 8 and the rod 12 may be locked by the set screw 14 in a position wherein the base of the yoke 16 is in contact with the lower surface of the torsion bar.

The gauge 9 may be employed in different fashions. For instance, in initially applying the gauge rod in measuring position relative to a control arm, the manufacturer's recommendation of the proper differential between the gauge bar and the ball joint assembly may be pre-set upon the calibrations 17 and the gauge rod may be locked in such position. Thus, when the gauge 9 is applied to the control arm, if the bubble in the spirit level 25 is substantially at its central position, the torsion rod is in the proper relationship with respect to the ball joint assembly. If the torsion rod is not in its proper elevation relative to the ball joint assembly, the torsion rod may then be adjusted by increasing or decreasing the torsion of the torsion bar, that is "winding it up" or "unwinding it." As the torsion bar is adjusted, the level of the gauge bar 10 will be raised or lowered and by observing the bubble of the spirit level the operator will be informed that the proper adjustment has been made when the bubble of the spirit level is substantially centered within the tube 26.

As another manner of use of the gauge 9, the set screw 14 may be loosened to permit free movement of the gauge rod 12 with respect to the gauge bar and in this condition the gauge 9 may be applied to the control arm. After the gauge has been secured to the control arm by the engagement of the flanges 21 with the flanges 27, and with gauge bar 10 held horizontally so as to center the bubble in level 26, the control rod may be moved upwardly until it contacts the lower surface of the torsion bar. When this contact is made, the differential in height of the torsion bar relative to the ball joint assembly can be read directly from the calibrations 17. If the reading is within the manufacturer's recommended differential range, the operator will be informed that the torsion bar is properly adjusted. If the torsion bar is out of adjustment, it may be adjusted until the calibrations 17 indicate the manufacturer's recommended differential.

It is preferable to simultaneously use a pair of the gauges 9, one applied to each of the control arms and hence the relative suspension heights at each side of the vehicle may be determined. By the use of the spirit levels it can readily be seen that with the manufacturer's recommended settings upon the opposite gauge rods 12 and with the bubbles of both of the spirit levels substantially centralized, the vehicle body will be substantially level upon its supporting wheels.

It is customary when making measurements upon suspension systems or where springs or the like are involved to check initial readings after the device supported by the springs has been oscillated. This operation is usually referred to in the art as "jouncing," that is, moving the body of the vehicle upwardly and downwardly so as to flex the resilient suspension system.

Accordingly, after making initial readings and adjustments the vehicle may be jounced and the readings may be reobserved. If the readings do not agree with the initial reading, of course, further adjustments must be made of the torsion bars. However, as a feature of the present invention after the gauges have been applied to the control arms and the initial readings taken, the vehicle may be jounced and by virtue of the unique resilient gripping means comprising the rods 19, gripping members 20 and springs 23, the gauge will retain its position upon the control arms during the jouncing operation. In other words, it is not necessary to mount the gauges to take initial readings; dismount them; jounce the vehicle, and remount the gauges before the verification readings are taken. Obviously, this is of convenience to the operator and saves his time.

Although suggested modes of use of the device have been presented herein, it is to be understood that the present invention is not to be limited to these specific modes of operation since the operation of testing or gauging the suspension height and levelness may be carried out in different sequences than those herein suggested. Accordingly, it is not intended that the present invention be specifically limited to a predetermined mode

I claim as my invention:

1. A gauge for measuring the suspension height of one side of a vehicle torsion bar suspension system of the type having opposite control arms pivotally connected to the respective wheels of a vehicle at corresponding ends and having their opposite ends resiliently biased by opposite torsion bars, said gauge comprising a gauge bar, an abutment carried at one end of said gauge bar for abutting the pivotal connection between a control arm and a wheel on one side of the vehicle, a spring pressed gripping rod slidably carried by said gauge bar, a gripping head carried by said gripping rod for gripping the control arm on the same side of the vehicle, and a calibrated gauge rod slidably carried by the opposite end portion of the gauge bar for contacting the torsion bar on the same side of the vehicle.

2. A gauge for measuring the suspension height of one side of a vehicle torsion bar suspension system of the type having opposite control arms pivotally connected to the respective wheels of a vehicle at corresponding ends and having their opposite ends resiliently biased by opposite torsion bars, said gauge comprising a gauge bar, an abutment carried at one end of said gauge bar and extending transversely thereto for abutting the pivotal connection between a control arm and a wheel on one side of the vehicle, a spring pressed gripping rod slidably carried by said gauge bar and movable in a direction substantialy parallel to said abutment, a gripping head carried by said gripping rod for gripping an intermediate portion of the control arm on the same side of the vehicle, and a calibrated gauge rod slidably carried by the opposite end portion of the gauge bar and movable in a direction substantially parallel to the abutment for contacting the torsion bar on the same side of the vehicle.

3. A gauge for measuring the suspension height of one side of a vehicle torsion bar suspension system of the type having opposite control arms pivotally connected to the respective wheels of a vehicle at corresponding ends and having their opposite ends resiliently biased by opposite torsion bars, said gauge comprising a gauge bar, an abutment carried at one end of said gauge bar for abutting the pivotal connection between a control arm and a wheel on one side of the vehicle, a spring pressed gripping rod slidably carried by said gauge bar, a gripping head carried by said gripping rod for gripping the control arm on the same side of the vehicle, a spirit level carried by said gauge bar and a calibrated gauge rod slidably carried by the opposite end portion of the gauge bar for contacting the torsion bar on the same side of the vehicle.

4. A gauge for measuring the suspension height of one side of a vehicle torsion bar suspension system of the type having opposite control arms pivotally connected to the respective wheels of a vehicle at corresponding ends and having their opposite ends resiliently biased by opposite torsion bars, said gauge comprising a gauge bar, an abutment carried at one end of said gauge bar and extending transversely to said gauge bar for abutting the pivotal connection between a control arm and a wheel on one side of the vehicle, a gripping rod slidably carried by said gauge bar and transversely movable relative thereto, a gripping head carried by said gripping rod for gripping the control arm on the same side of the vehicle, resilient means acting between the gauge bar and gripping rod for resiliently urging said gripping head toward said gauge bar, and a calibrated gauge rod slidably carried by the opposite end portion of the gauge bar and movable transversely relative thereto for contacting the torsion bar on the same side of the vehicle.

5. A gauge for measuring the suspension height of one side of a vehicle torsion bar suspension system of the type having opposite control arms pivotally connected to the respective wheels of a vehicle at corresponding ends and having their opposite ends resiliently biased by opposite torsion bars, said gauge comprising a gauge bar, an abutment carried at one end of said gauge bar and extending transversely to said gauge bar for abutting the pivotal connection between a control arm and a wheel on one side of the vehicle, a gripping rod slidably carried by said gauge bar and transversely movable relative thereto, a gripping head carried by said gripping rod for gripping the control arm on the same side of the vehicle, resilient means acting between the gauge bar and gripping rod for resiliently urging said gripping head toward said gauge bar, a calibrated gauge rod slidably carried by the opposite end portion of the gauge bar and movable transversely relative thereto for contacting the torsion bar on the same side of the vehicle and a spirit level carried by said gauge bar for determining the angular inclination of the gauge bar relative to the spirit level in a plane which includes the longitudinal axes of the gauge bar, the abutment and the gauge rod.

6. A device as claimed in claim 5 including adjustable means for mounting said spirit level on said gauge bar for changing the angular inclination of said spirit level relative to the longitudinal axis of said gauge bar.

References Cited in the file of this patent

UNITED STATES PATENTS

| 1,653,249 | Bennett | Dec. 20, 1927 |
| 2,603,881 | Holaday | July 22, 1952 |

FOREIGN PATENTS

| 475,064 | Canada | July 10, 1951 |